United States Patent
Kirk et al.

(10) Patent No.: US 10,923,775 B2
(45) Date of Patent: Feb. 16, 2021

(54) COLD STORAGE CHARGING SYSTEM AND METHOD

(71) Applicant: THE RAYMOND CORPORATION, Greene, NY (US)

(72) Inventors: John Bryant Kirk, Greene, NY (US); Mike Welch, Endicot, NY (US); Tanvir Reza Tanim, State College, PA (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 15/678,365

(22) Filed: Aug. 16, 2017

(65) Prior Publication Data

US 2018/0053972 A1    Feb. 22, 2018

Related U.S. Application Data

(60) Provisional application No. 62/375,613, filed on Aug. 16, 2016.

(51) Int. Cl.
*H02J 7/00* (2006.01)
*H01M 10/44* (2006.01)
(Continued)

(52) U.S. Cl.
CPC ......... *H01M 10/443* (2013.01); *B60L 3/0046* (2013.01); *B60L 53/60* (2019.02); *B60L 58/27* (2019.02); *H01M 10/0525* (2013.01); *H01M 10/46* (2013.01); *H01M 10/486* (2013.01); *H01M 10/615* (2015.04); *H01M 10/625* (2015.04); *H01M 10/63* (2015.04); *H01M 10/6571* (2015.04); *H02J 7/007192* (2020.01); *B60L 50/64* (2019.02); *B60L 2200/42* (2013.01);
(Continued)

(58) Field of Classification Search
CPC ............ H01M 10/443; H01M 10/615; H01M 10/625; H01M 10/63; H01M 10/6571; H01M 10/0525; H01M 10/46; H01M 10/486; B60L 53/60; B60L 58/27; B60L 3/0046; H02J 7/047
USPC .......................................... 320/109; 701/22
See application file for complete search history.

(56) References Cited

U.S. PATENT DOCUMENTS

| 4,081,737 A | 3/1978 | Miyahara |
| 2006/0089733 A1 | 4/2006 | Dickinson |

(Continued)

FOREIGN PATENT DOCUMENTS

| WO | 2014024708 A1 | 2/2014 | |
| WO | WO-2014024708 A1 * | 2/2014 | ............. B60L 58/12 |

OTHER PUBLICATIONS

Extended European Search Report issued in corresponding European Application No. 17186243.6, dated Jan. 18, 2018, 7 pages.

(Continued)

*Primary Examiner* — Zixuan Zhou
(74) *Attorney, Agent, or Firm* — Quarles & Brady LLP

(57) ABSTRACT

Systems and methods for temperature control for an energy source of a material handling vehicle. The system includes a battery management system in communication with the energy source that can also be in communication with a charger. The system further includes a counterweight case that supports the energy source, and a plurality of resistive heating elements positioned along one or more surfaces of the counterweight case.

23 Claims, 5 Drawing Sheets

(51) Int. Cl.
- *B60L 3/00* (2019.01)
- *B60L 53/60* (2019.01)
- *B60L 58/27* (2019.01)
- *H01M 10/615* (2014.01)
- *H01M 10/625* (2014.01)
- *H01M 10/63* (2014.01)
- *H01M 10/6571* (2014.01)
- *H01M 10/0525* (2010.01)
- *H01M 10/46* (2006.01)
- *H01M 10/48* (2006.01)
- *B60L 50/64* (2019.01)

(52) U.S. Cl.
CPC ..... *B60L 2240/42* (2013.01); *B60L 2240/545* (2013.01); *H01M 2220/20* (2013.01); *Y02T 10/64* (2013.01); *Y02T 10/70* (2013.01); *Y02T 10/7072* (2013.01); *Y02T 90/12* (2013.01); *Y02T 90/14* (2013.01); *Y02T 90/16* (2013.01)

(56) References Cited

U.S. PATENT DOCUMENTS

| | | | |
|---|---|---|---|
| 2008/0122399 A1* | 5/2008 | Nishino | H02J 7/0069 320/103 |
| 2008/0285193 A1* | 11/2008 | Watanabe | H01M 10/482 361/88 |
| 2012/0277058 A1* | 11/2012 | Ishikawa | H01M 10/6571 477/3 |
| 2013/0207617 A1 | 8/2013 | Houchin-Miller et al. | |
| 2013/0214737 A1* | 8/2013 | Wu | B60L 53/60 320/109 |
| 2014/0021913 A1* | 1/2014 | Martin | B60L 53/65 320/109 |
| 2015/0239405 A1 | 8/2015 | Kaihara | |

OTHER PUBLICATIONS

Scott, D. et al. "LBNL-1004300 Refrigerated Warehouse Demand Response Strategy Guide", Nov. 1, 2015.

* cited by examiner

COLD STORAGE CHARGING SYSTEM AND METHOD

BACKGROUND

In conventional systems for material handling vehicles such as forklifts, lead acid batteries have historically been used as an energy source. Lithium Ion batteries and other alternative energy sources have also been used to provide power to material handling vehicles. Traditionally, material handling vehicles operate in warehouses, manufacturing centers, and distribution centers, among other locations, which may include refrigerated warehouses, blast freezers, and other cold chain storage locations. Material handling vehicles can be designed for cold locations and can include a battery that has a longer battery run time and life.

Relatively few features, if any, are used to help control battery temperature (e.g., in very cold environments). Although some batteries can operate at temperature extremes, other batteries can suffer from significant performance loss. Lead Acid Batteries (LABs), for instance, have difficulties in cold temperature operation because a higher internal resistance reduces both power and the available energy such that the LAB may not support a full shift of operation. Moreover, during cold environment operation, a higher internal resistance reduces the efficiency of charging when the material handling vehicle uses regenerative braking. As a result, at low temperatures, it becomes more difficult to charge or use a LAB. LABs typically do not utilize a Battery Management System (BMS), so there is no way for a battery charger to determine the battery temperature and adjust a charging operation.

Furthermore, performance of Lithium Ion Batteries (LIBs) can also be significantly limited by temperature. For example, cold temperatures can reduce the available power from these batteries, and charging at low temperatures can damage the battery cells. This means that material handling vehicles and/or the battery packs connected thereto that operate in sub-zero temperatures need to be removed to a dedicated charging station, warm up to room temperature, and then the battery can be charged.

Existing technology does not provide adequate assistance in keeping the battery of a material handling vehicle warm or heating up the battery to make it practical to charge. Instead, a significant amount of time is spent waiting for the ambient air to warm a battery that can weigh more than 1,000 pounds. Furthermore, the current practice of recharging cold batteries involves driving the material handling vehicle out of the refrigerated area to charge the battery, or swapping the cold battery out for a warm battery. Typically, the low temperature of the battery requires that each truck have multiple batteries: one in the material handling vehicle, one warming up, and one being charged.

Because typical material handling vehicles are removed frequently from sub-zero environments to room temperature for charging, condensation, thermal stress, and/or temperature excursion are induced on both the battery pack and the material handling vehicle. This thermal cycle can significantly reduce the life and reliability of the battery and the vehicle. This charging process is also time consuming and inefficient. Thus, there is a need for systems and methods of charging a battery of a material handling vehicle while the battery is cold (e.g., below zero degrees Celsius).

SUMMARY

Some embodiments of the disclosure provide a system for temperature control for an energy source of a material handling vehicle. The system can include a battery management system in communication with the energy source, a counterweight case that supports the energy source, and a heating element positioned within the counterweight case, wherein the heating element can heat the energy source. The heating element can be positioned on at least one of the counterweight and the energy source. In some embodiments, an automatic charger can be disposed within a refrigerated space or externally next to an insulated wall of the refrigerated space when the material handling vehicle is disposed within the refrigerated space. In some embodiments, battery information can be sent between the charger and the battery management system.

In some embodiments, a wireless interface can couple the automatic charger with the battery management system. In some embodiments, the battery information can include a total nominal capacity discharged by the energy source. In some embodiments, the battery information can include an internal resistance of the battery and a history of operating temperatures of the energy source. In some embodiments, the heating element can include a plurality of heating elements, and at least one of the plurality of heating elements can be positioned to heat the counterweight, and at least another of the plurality of heating elements can be positioned to heat the energy source. In some embodiments, the system can include an automatic charger coupled with the battery management system.

In some embodiments, a truck control system can be in communication with the battery management system. In some embodiments, a wired CAN interface can be coupled with the battery management system and an automatic charger. In some embodiments, the energy source can be a Lithium Ion battery. In some embodiments, the battery management system can be operable to provide a voltage to the heating elements when a battery temperature falls below a temperature threshold, or can provide a voltage to the energy source when the battery temperature falls below the temperature threshold. In some embodiments, one or more insulating features can be provided along one or more surfaces of the battery.

Further embodiments of the disclosure provide for a method of charging an energy source. The method can include providing a battery including a counterweight case and an energy source, providing at least one heating element positioned to heat at least one of the counterweight case and the energy source, coupling the energy source to a battery management system, and providing instructions to the battery management system. The instructions can include providing a voltage to the at least one heating element when a battery temperature falls below a temperature threshold, or providing an AC voltage to the energy source when the battery temperature falls below the temperature threshold. In some embodiments, the temperature threshold can be zero degrees Celsius. In some embodiments, the method can further include sending battery information between the battery management system and the charger. In some embodiments, the method can further include providing instructions to send battery information between the battery management system and a truck control system.

BRIEF DESCRIPTION OF THE DRAWINGS

The accompanying drawings, which are incorporated in and form a part of this specification, illustrate embodiments of the invention and, together with the description, serve to explain the principles of embodiments of the disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Likewise, "at least one of A, B, and C," and the like, is meant to indicate A, or B, or C, or any combination of A, B, and/or C. Unless specified or limited otherwise, the terms "mounted," "secured," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise defined or limited, the term "battery" can be viewed as including the relevant battery cells, as well as other components included in the same general structure as the battery cells. With regard to lithium ion batteries, for example, the term "battery" can encompass the battery cells and a battery case containing the battery cells, as well as various bus bars, switches, disconnects, or contactors, other electronics and other components of an associated battery management system.

Figure 1:
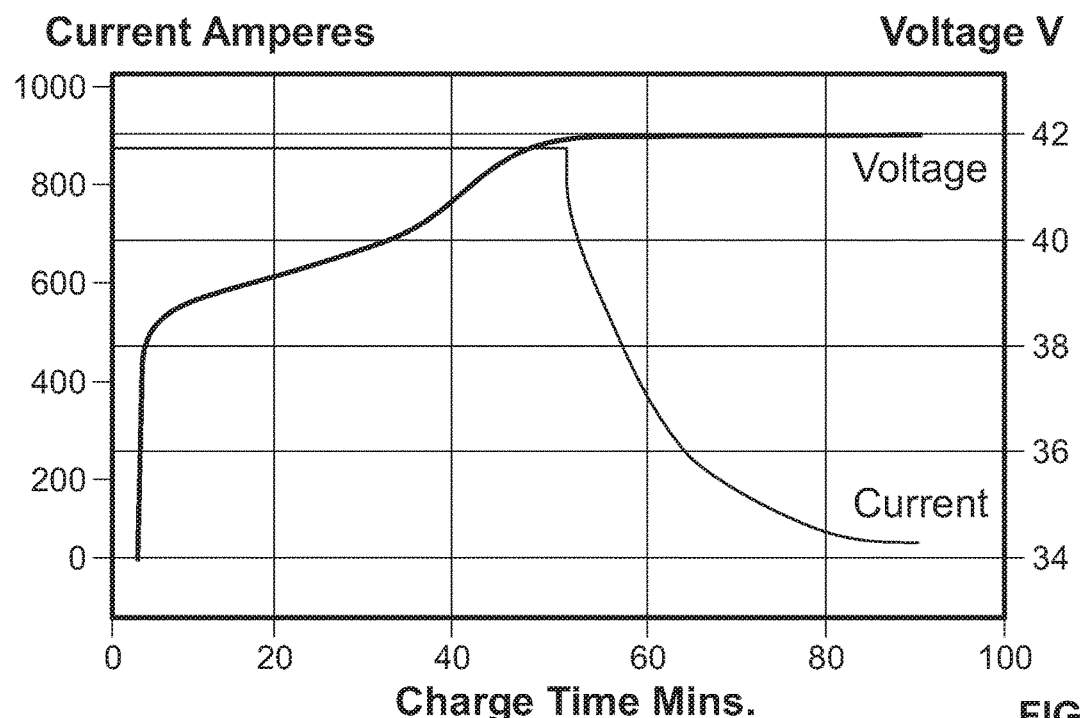
FIG. 1 is a graph illustrating a generic CC-CV charging protocol.

Lithium Ion batteries (LIBs) are conventionally charged via a constant current-constant voltage (CC-CV) charging protocol. A graph illustrating a generic example of CC-CV charging is illustrated in FIG. 1. In a CC-CV protocol, the cells are charged at a manufacturer specified CC rate (e.g., 0.1 to 1C, C=current/nominal battery capacity) up to a manufacturer specified upper voltage limit ($V_{batt,max}$) and then switched to a manufacturer specified CV charging where the current tapers down to hold the $V_{batt,max}$. This charging protocol is specifically designed for room temperature applications. Charging LIBs at sub-zero temperatures using CC-CV protocol may cause lithium plating at the anode of the cell. Lithium plating aggressively degrades battery life. Most LIB manufacturers avoid charging at sub-zero temperatures, i.e., charging is stopped when the cell temperature falls below a certain threshold temperature value (typically about zero degrees Celsius). There are also multi-step CC-CV protocols that require a longer charging time compared to a single CC-CV charging protocol. Further, multi-step CC-CV charging does not ensure the complete avoidance of lithium plating at sub-zero temperatures. The following description details a system that is compatible with either a single or a multiple CC-CV charging protocol in a cold environment.

Figure 2:
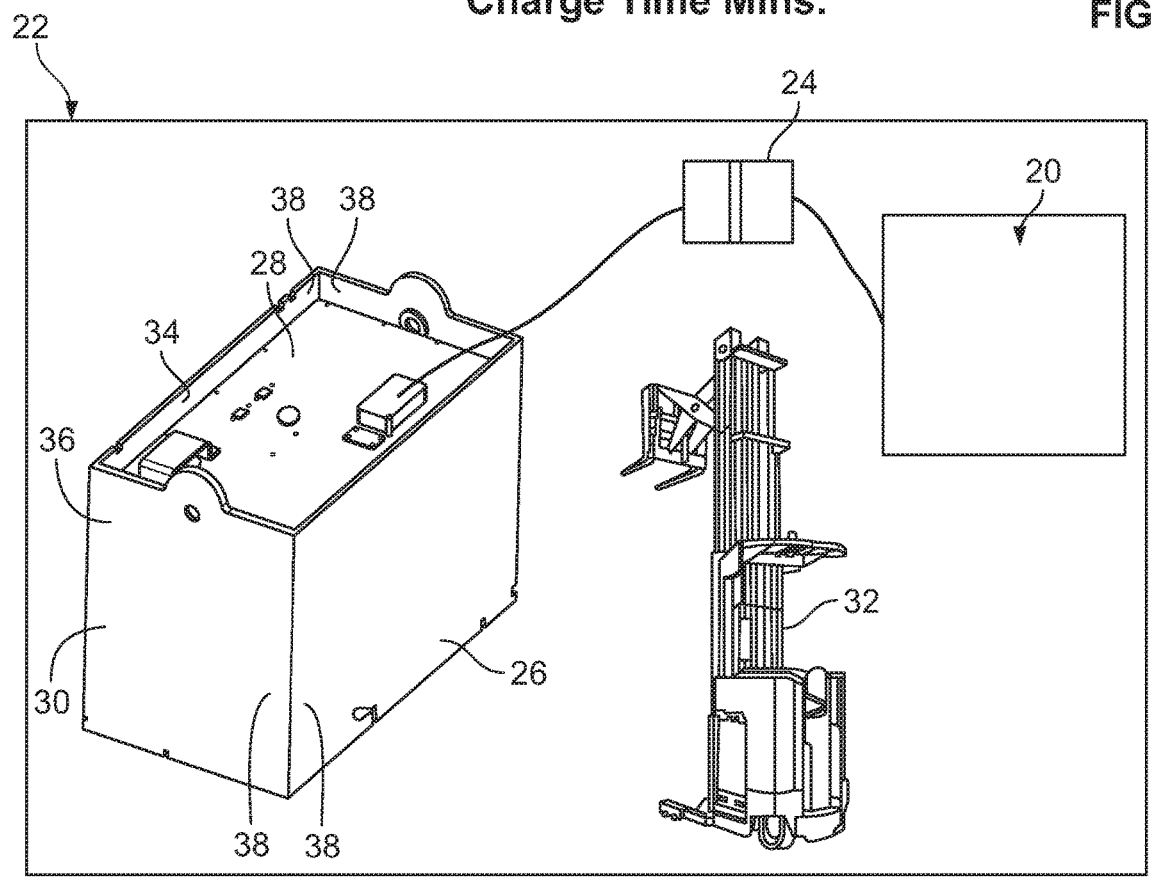
FIG. 2 is a schematic representation of the system described herein.

FIG. 2 illustrates components of the system described herein. An automatic charger 20 is shown, which can be located inside a refrigerated space 22 or, alternatively, outside of the refrigerated space 22 to reduce the waste heat expelled inside the refrigerated space 22. The refrigerated space 22 can be a warehouse, a refrigerator, an outdoor space, or any other space having a sub-zero or refrigerated temperature. A battery management system (BMS) 12 (see FIG. 3) can operate a communication link 24 between a battery 26 and the automatic charger 20. In some embodiments, the communications link 24 also carries DC power to charge the battery 26 and may include separate AC power circuits to supply heaters. The battery 26 is also shown, the battery 26 referring to both an energy source 28 (LAB or LIB) and a counterweight case 30. In some embodiments, a material handling vehicle 32 can accept several different kinds of energy systems or batteries 26. The counterweight case 30 includes an inner surface 34, an outer surface 36, and side walls 38.

Figure 3:
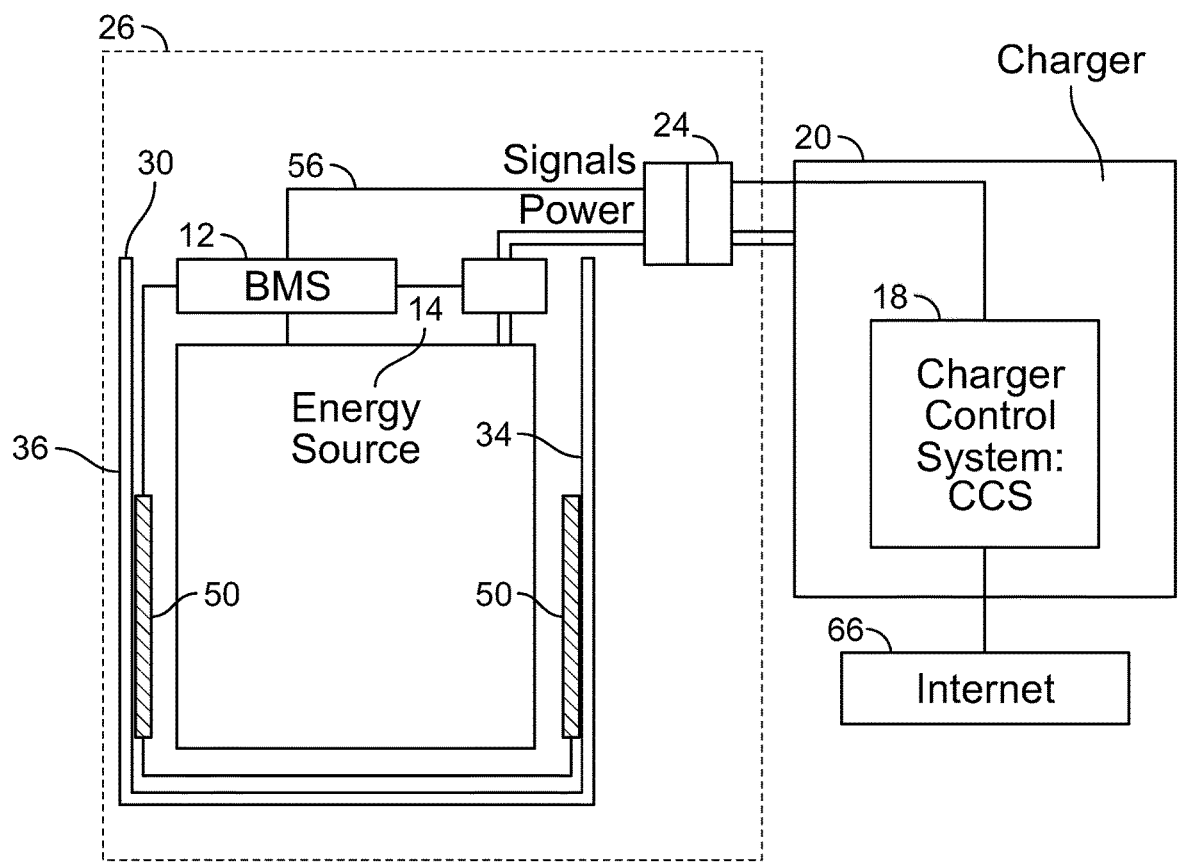
FIG. 3 is a schematic representation of some of the components of the system of FIG. 2.

During operation of the material handling vehicle 32 in the refrigerated space 22, the battery 26 generates heat due to self-heating, i.e., heat given off by the battery 26 during normal operation. As the battery state of charge (BSOC) falls, the voltage of the battery 26 drops. At the end of a shift of use of the material handling vehicle 32, when the voltage of the energy source 28 reaches a lower voltage limit $V_{min}$, the battery 26 remains warm. Referring to FIG. 3, in some embodiments, upon hooking up the battery 26 with the automatic charger 20, the BMS 12 can monitor a battery temperature of the battery 26 and can begin the charging process using the conventional CC-CV charging rate, as will be described in greater detail below. The BMS 12 can automatically decide the CC charging rate based on the measured battery temperature without imposing any negative effect of lithium plating. A relatively warm battery (approximately 25 degrees Celsius) allows for a higher CC charging rate.

Referring to FIGS. 2 and 3, during charging, if the battery temperature is not sufficiently high enough, the BMS 12 can power up one or more resistive heating elements 50 located inside the battery 26 along the inner surface 34 of the counterweight case 30. The power for the heaters can come from (1) DC power from charger 20, (2) a 60 Hz AC current supplied via communications link 24 from the charger 20, or (3) the battery DC power to heat up the battery 26. The resistive heating elements 50 may include, but are not limited to, any of the following: metal heating elements, including Nichrome; resistance wire including Kanthal (FeCrAL) wires, Nichrome 80/20 wires, and/or Cupronickel (CuNi) alloys; or Etched foil; ceramic heating elements, including Molybdenum disilicide ($MoSi_2$); PTC Ceramic elements; polymer PTC heating elements; composite heating elements, including tubular heating elements which can be gold coated, ruby red coated, or clear; screen-printed elements; or radiative heating elements. The resistive heating elements 50 may be disposed on any of the inner surfaces 34 of the counterweight case 30. In some embodiments, the inner surface 34 of the counterweight case 30 can be adequately insulated to minimize heat loss. It should be noted that the heating elements 50 may also be mounted on the outside or inside the energy source 28 instead of along the counterweight 30. Once the energy source 28 is fully charged using CC-CV charging technique, the BMS 12 can stop charging the energy source 28 and can provide power to the resistive heating elements 50 to keep the energy source 14 warm utilizing external power before beginning the next shift. This process can aide in providing maximum energy extraction from the battery 26 for the next shift.

Still referring to FIG. 3 and as stated above, the BMS 12 may supply an AC current from the charger 20 to heat up the cells of the battery 26. This type of heating is called Joule heating or resistance heating. Joule heating is the generation of heat by the motion of electric charge through a metal or other conductive material. As a result, when the current is supplied to the energy source 14, heat is produced by electrochemical operation and Joule heating. In some embodiments, the energy source 14 is a LIB, which is composed of cells each with two electrodes and a non-aqueous electrolyte, which allows for ionic movement. During charging, lithium ions move from the cathode, flow through the electrolyte, and become captured within the crystalline structure of a carbon-based anode. When discharged, the process reverses and these ions flow back, resulting in the reverse electrical flow of current to power the device's circuit. As this process occurs, which is similar to electric current flowing through a wire, internal resistance within the electrolyte creates the Joule heating.

Still referring to FIG. 3, in some embodiments, battery heating is accomplished by heating the resistive heating elements 50, which are heated up by the BMS 12. The BMS 12 may determine that heating is required based on the temperature of the energy source 14 and can send a current through the resistive heating elements 50. Subsequently, the BMS 12 could use the internal impedance of the energy source 14 as a heater by shorting the energy source 14 carefully through a high current/low resistance device (not shown) coupled with the energy source 14. Some energy sources, such as Lithium Ion Batteries, are worn by charging far more than by discharging. Thus, discharging the battery 26 to warm it is more practical with a LIB than a LAB. As one of ordinary skill in the art would recognize, the charger 20 can provide substantial power to support the charging operation without discharging the battery 26. The charger 20 can also supply DC or AC power to the heaters 50 under the control of the BMS 12.

Figure 4:
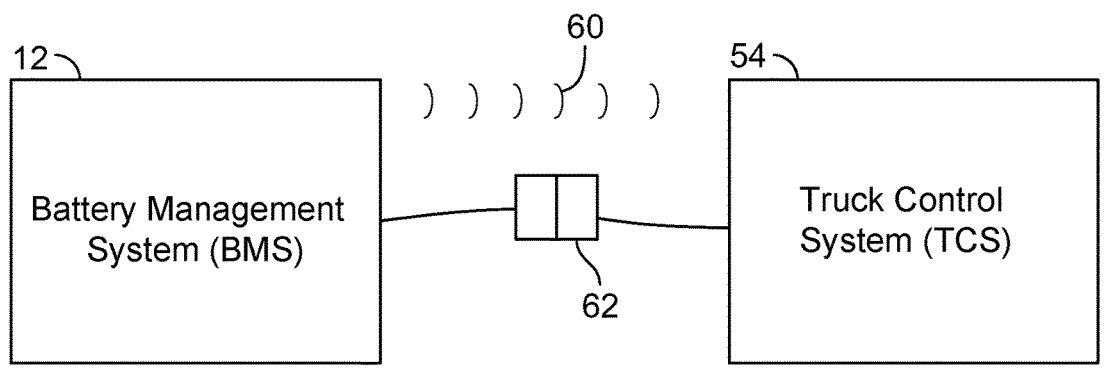
FIG. 4 is a schematic representation of some components of another embodiment of the system of FIG. 2.

In a preferred embodiment and referring to FIG. 4, the BMS 12 can communicate with a truck control system 54 (TCS) (which can be positioned on the material handling vehicle 32) while the material handling vehicle 32 is in operation. The design of the counterweight case 30 can provide insulation from the external cold. The counterweight case 30 can support the energy source 28 on insulating pads to prevent direct contact with the counterweight case 30. This provides an air gap, which may alternatively be filled with insulation, as will be discussed in detail hereinafter below. While the outer surface 36 of the counterweight case 30 may reach −40 degrees Celsius, the energy source 14 inside the counterweight case 30 can remain considerably warmer. The BMS 12 can communicate with the TCS 54 using a standard digital bus, for example a control area network bus (CAN bus) 56 (see FIG. 3). The CAN bus 56 may have one or more extra wires, such as a WAKE & RETURN lines (not shown), that let the BMS 12 know when the operator is plugging the battery 26 into the material handling vehicle 32 or the automatic charger 20, and/or when the operator is unplugging the battery 26 from the material handling vehicle 32 or the automatic charger 20.

After using the material handling vehicle 32 to move goods or for any other purpose, the user or operator can stop the material handling vehicle 32, unplug the battery 26 from TCS 54, and plug the battery 26 into the automatic charger 20. A typical example of an automatic charger 20 is the Posicharger SVS-300 manufactured by AeroVironment, Inc., but the automatic charger 20 may be any charger known to those of ordinary skill in the art. In some embodiments, the BMS 12 can communicate with the automatic charger 20 and either charge the energy source 28, or provide power to keep the battery 26 warm while the battery 26 is charging. The operator need only plug the battery 26 into the charger 20, or unplug the battery 26 from the charger 20. The operator need not see the charger control panel or program the charging or warming function. The BMS 12 can command the automatic charger 20 to handle all charging and warming functions without operator input.

There are many advantages to the systems and methods of charging disclosed herein. This charging protocol can eliminate lithium plating and can provide for a longer battery life. The charging protocol can also reduce charging time with a faster CC charging rate. Warm batteries, including LIBs, have lower internal resistance and permit faster charging and more energy efficient charging. The systems and methods disclosed herein can further save time and labor because the material handling vehicle 32 may remain in the refrigerated space 22 and either can be in use or not in use yet remain both charged and warm.

Moreover, the location of the automatic charger 20 can be changed. For example, the automatic charger 20 may be moved inside of the refrigerated space 22 instead of using up warehouse space for a separate charging area (not shown). Or the automatic charger 20 can be located outside of the refrigerated space 22 with only the cables passing through the refrigerator's insulated wall, and in some embodiments a radio frequency transparent window may be included within the wall of the refrigerated space to permit wireless information transfer with the external charger 20. With the BMS 12 in control of the charger 20 there is no need for the operator to access the charger controls or see the charger 20.

Further, normal truck wear due to condensation and thermal cycling of truck components and circuitry can be reduced because the material handling vehicle 32 need not be moved from a cold space to a warm space for charging. As a result, thermal cycling fatigue of the battery 26 is reduced. The use of an automatic charger 20, combined with the communications link 24 to the BMS 12 can provide the benefit of reducing the labor of the human operator. The use of the automatic charger 20 can further reduce a need for extra batteries. Rather than having two or up to three or four batteries 26 that are rotated between a charging station (not shown) and the material handling vehicle 32, an operator only needs one dedicated "freezer battery." The system disclosed herein can further allow for opportunity charging while the battery 26 is in the freezer environment, which can lead to more operator time for useful work.

Figure 5:
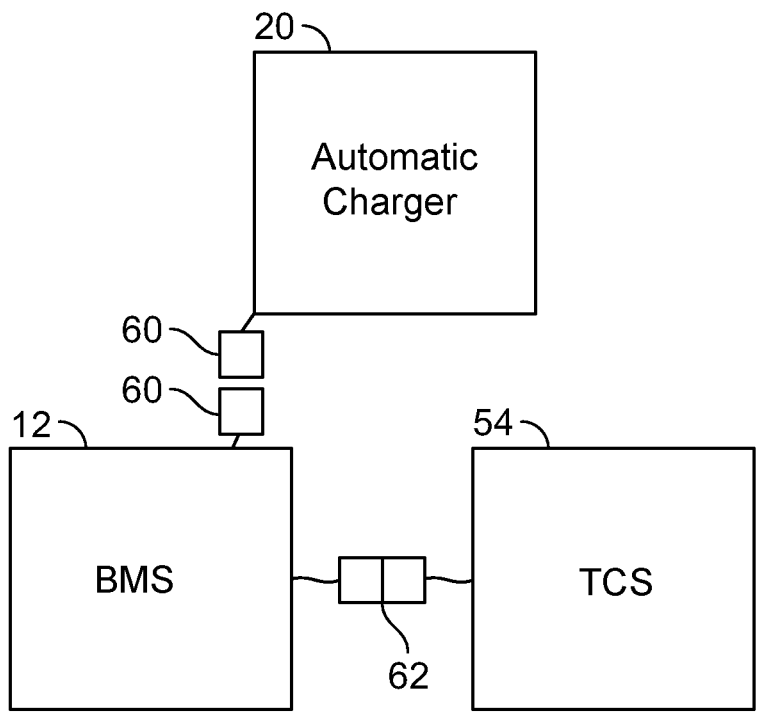
FIG. 5 is a schematic representation of some components of another embodiment of the system of FIG. 2.
Figure 6:
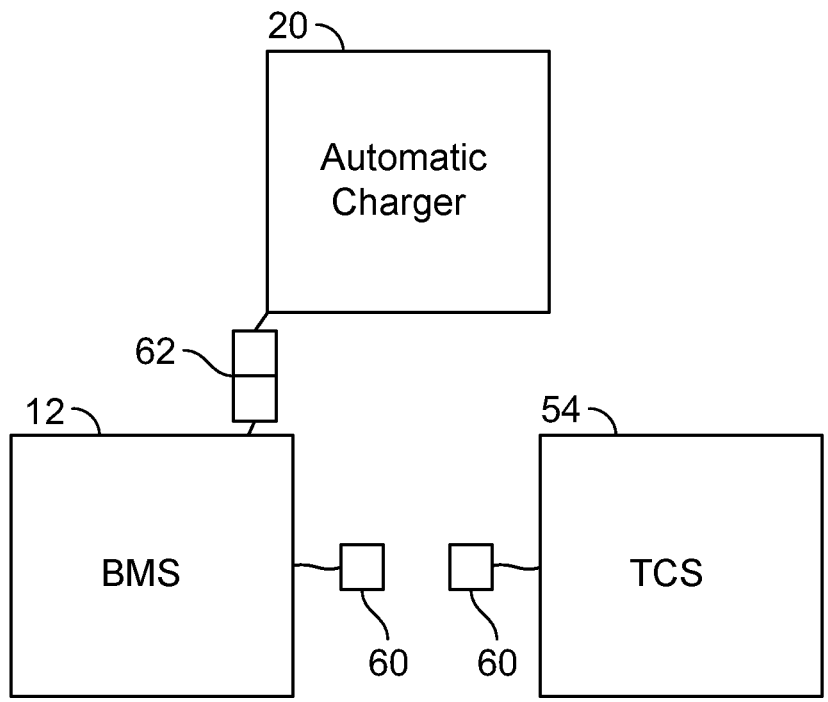
FIG. 6 is a schematic representation of some components of another embodiment of the system of FIG. 2.

In other embodiments, a different wired bus interface can be used to communicate between the TCS 54 and the BMS 12 and between the BMS 12 and the automatic charger 20. For example, CAN, RS-232, or any other serial interface could alternatively be used. Further, as illustrated in FIG. 4, a wireless interface 60 and/or a wired interface 62 can be used to handle the communication. In other embodiments, as shown in FIG. 5, the wired interface 62, which may be a CAN bus, may be used for communication between the TCS 54 and the BMS 12 and the wireless interface 60 may be used for communication between the charger 20 and the BMS 12. Or as shown in FIG. 6, the wired interface 62 may be used for communication between the charger 20 and the BMS 12 and the wireless interface 60 may be used for communication between the TCS 54 and the BMS 12.

In some embodiments, the charging process may be monitored and battery information may be sent and received via the Internet 66 (see FIG. 3). The battery information may include a total nominal capacity or amp hours (AH) discharged by the battery 26 such as odometer information, or battery wear information such as the total AH of charge. Other battery information may also be sent, including fault codes, an estimate of the battery state of health, an estimate of the battery's internal resistance, and/or a history of battery operating temperatures. The battery information could be received from either the automatic charger 20 or wirelessly from the truck control system 54. Once sent out to the Internet 66 (see FIG. 3), the user can monitor the condition of the battery 26 and can detect, for example, battery overcharging, or the decline in the capacity (State of Health) of the battery 26. For example, the battery information could be used to warn when the battery 26 has not been charged and is at risk of permanent damage (also known as 'bricking').

Figure 7:
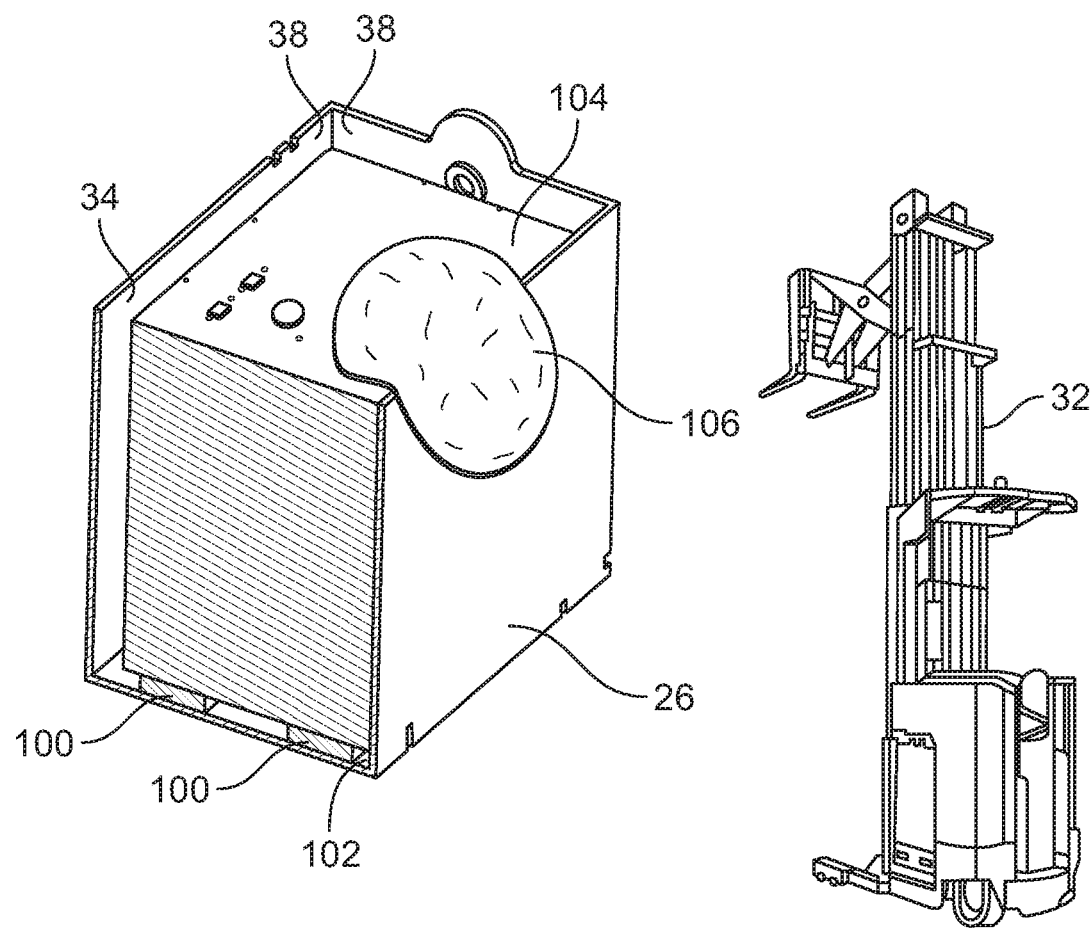
FIG. 7 is a schematic representation of another system as described herein.

Furthermore, the design of the counterweight case 30 can provide insulation from the cold and protection from condensation by many methods. One or more of the following insulating features may be implemented to provide for adequate insulation. One method is to support the battery 26 on rubber pads 100, as illustrated in FIG. 7, that prevent direct contact with the metal counterweight case 30. This creates an air gap 102 that insulates the battery 26. Likewise, a top 104 of the battery 26 can be covered with a thermal blanket 106 to insulate against heat transfer. Insulation around the battery 26 could be built into one or more of the walls 38 of the counterweight case 30 or the entire counterweight case 30 could be covered by the thermal blanket 106. In some embodiments, insulation is provided within the space that defines the air gap 102. The design of the material handling vehicle 32 can incorporate insulation and other methods to prevent the cold freezer air from reaching or flowing around the counterweight case 30 and/or the battery 26.

Figure 8:
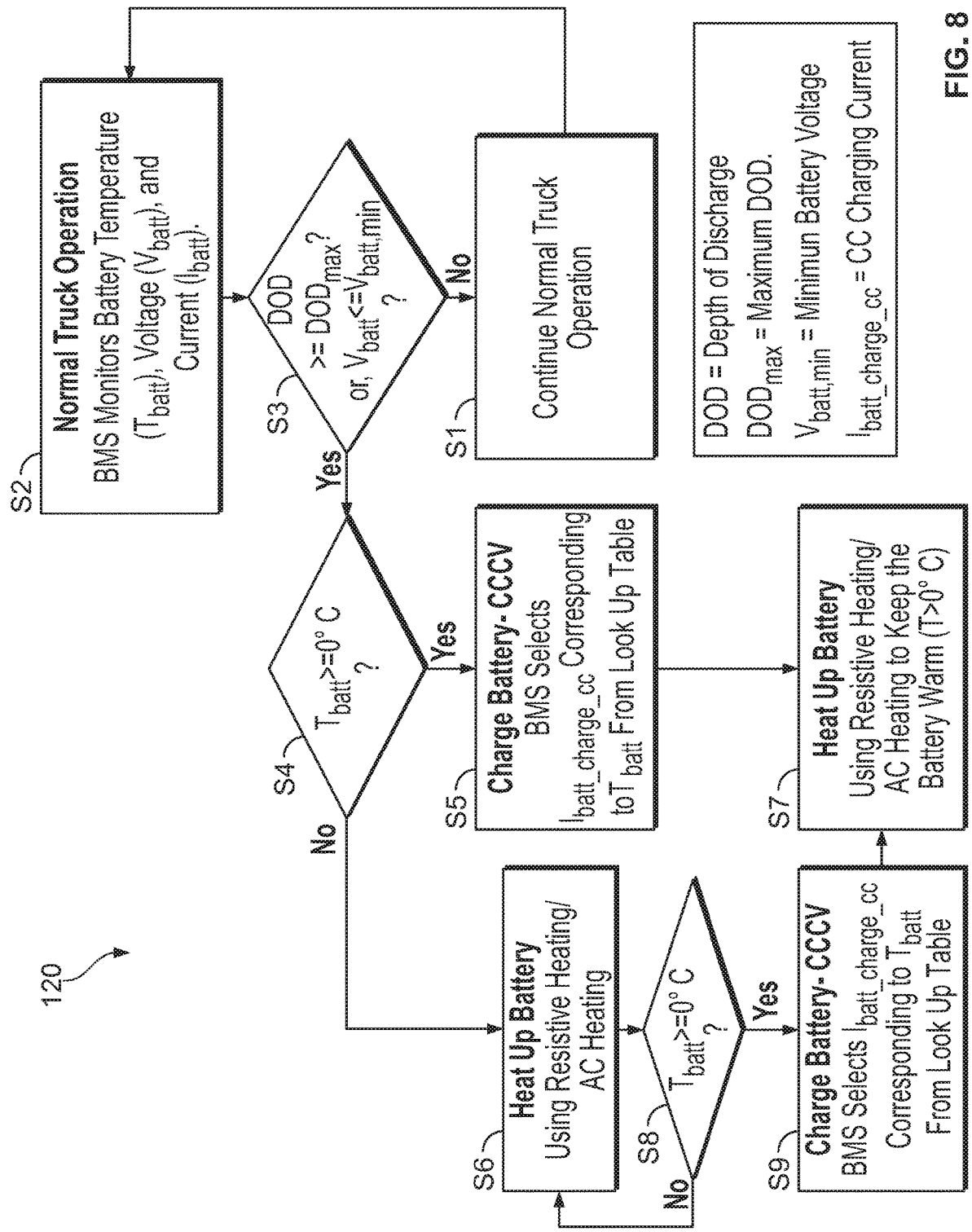
FIG. 8 is a diagram representing a method of warming a battery as described herein.

Referring now to FIG. 8, a method 120 of charging the energy source 28 is illustrated. Throughout the steps of the method 120, the BMS 12 monitors a battery voltage, battery current, and a battery temperature. The method 120 begins at step S1, which is where normal truck operation occurs. The method 120 proceeds to step S2, where normal truck operation continues. At step S2, the BMS 12 monitors a battery temperature $T_{batt}$, a voltage $V_{batt}$, and a current $I_{batt}$. If at step S2 the BMS 12 determines that the battery voltage $V_{batt}$ has been reduced to a lower voltage limit $V_{batt,min}$, then the user is instructed to connect the battery 26 of the material handling vehicle 32 to the charger 20. At the next step, step S3, the depth of discharge is measured by the BMS 12. If at step S3 the depth of discharge is greater than or equal to a maximum depth of discharge, or the $V_{batt}$ is less than or equal to the $V_{batt,min}$, then the method 120 proceeds to step S4. If, however, the depth of discharge is less than the maximum depth of discharge, or $V_{batt}$ is greater than a minimum $V_{batt}$, then the method 120 can proceed back to step S1.

At step S4, the temperature of the battery, $T_{batt}$, is measured by the BMS 12. If the $T_{batt}$ is greater than or equal to zero degrees Celsius, then the method 120 can proceed to step S5. If, however, the $T_{batt}$ is less than zero degrees Celsius, the method 120 can proceed to step S6. At step S5, the BMS 12 can instruct the charger 20 to charge the battery 26 by selecting a current $I_{bat\_charge_{cc}}$ corresponding with the temperature $T_{batt}$ found within a lookup table stored within the BMS 12. The BMS 12 then charges with a specific CC charging rate based on the battery temperature $T_{batt}$. The method 120 can then proceed to step S7, where, using resistive heating or AC heating, the battery 26 is heated to keep the battery 26 above zero degrees Celsius, for example. In some embodiments, the AC current is first passed through the battery 26 to increase the battery temperature, and if necessary, the resistive heating elements 50 are turned on to create more heat. Once the battery 26 is near fully or fully charged, the BMS 12 can route power only to the resistive heating elements 50 to keep the battery 26 at a desired temperature until the beginning of the next shift.

If the method 120 proceeds instead to step S6, the BMS 12 can instruct the automatic charger 20 to heat up the battery 26 using resistive heating or AC heating. The method 120 can then proceed to step S8. At step S8, the BMS 12 can measure the $T_{batt}$ to determine whether the temperature $T_{batt}$ of the battery 26 is above zero degrees Celsius. If the temperature $T_{batt}$ is not above zero degrees Celsius, the method 120 can return to step S6. The BMS 12 can continually loop between steps S6 and S8 until $T_{batt}$ is above zero degrees Celsius. If, however, the battery 26 rises above zero degrees Celsius, then the method can proceed to step S9. At step S9, the BMS 12 can instruct the charger 20 to charge the battery 26 by selecting $I_{batt\_charge\_cc}$ corresponding with the temperature $T_{batt}$ found within a lookup table stored within the BMS 12. After step S9, the method 120 can proceed to step S7. At step S7, using resistive heating or AC heating, the battery 26 can be heated to keep the battery 26 above zero degrees Celsius, for example.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A system for temperature control for an energy source of a material handling vehicle, the system comprising:
   a battery management system in communication with the energy source, wherein the energy source is a lithium ion battery;
   a counterweight case that supports the energy source; and
   a heating element positioned within the counterweight case, the heating element to heat the energy source,
   wherein if a voltage of the energy source falls below a minimum voltage threshold, the battery management system determines if a minimum temperature threshold is reached based on measurement of a temperature of the energy source, and wherein the battery management system is configured to provide instructions to heat the heating element if the temperature of the energy source is less than or equal to the minimum temperature threshold.

2. The system of claim 1, wherein the heating element is positioned on at least one of the counterweight case and the energy source.

3. The system of claim 2, wherein an automatic charger is disposed within a refrigerated space or externally next to an insulated wall of the refrigerated space when the material handling vehicle is disposed within the refrigerator space.

4. The system of claim 3 further comprising:
a wireless interface that couples the automatic charger and the battery management system.

5. The system of claim 3, wherein battery information is sent between the charger and the battery management system.

6. The system of claim 5, wherein the battery information includes a total nominal capacity discharged by the energy source.

7. The system of claim 5, wherein the battery information includes an internal resistance of the energy source and a history of operating temperatures of the energy source.

8. The system of claim 3 further comprising:
a wired CAN interface coupled with the battery management system and the automatic charger.

9. The system of claim 2, wherein the automatic charger is disposed exterior to a refrigerator space when the material handling vehicle is disposed within the refrigerator space.

10. The system of claim 1, wherein the heating element includes a plurality of heating elements, and at least one of the plurality of heating elements is positioned to heat the counterweight and at least another of the plurality of heating elements is positioned to heat the energy source.

11. The system of claim 1 further comprising:
an automatic charger coupled with the battery management system.

12. The system of claim 1 further comprising:
a truck control system in communication with the battery management system.

13. The system of claim 1, wherein the battery management system is operable to:
provide an AC voltage to the heating elements when a battery temperature falls below the minimum temperature threshold; or
provide the AC voltage to the energy source when the battery temperature falls below the minimum temperature threshold.

14. The system of claim 13 further comprising:
one or more insulating features provided along one or more surfaces of the energy source.

15. The system of claim 14, wherein the one or more insulating features includes a thermal blanket.

16. The system of claim 1, wherein the minimum temperature threshold is below 0 degrees Celsius.

17. A system for temperature control for an energy source of a material handling vehicle, the system comprising:
a battery management system in communication with the energy source, wherein the energy source is a lithium ion battery;
a counterweight case that supports the energy source;
a charger coupled with the battery management system; and
a plurality of resistive heating elements positioned to heat the energy source,
wherein at least a first heating element of the plurality of heating elements is positioned to heat the counterweight and at least a second heating element of the plurality of heating elements is positioned to heat the energy source,
wherein if a voltage of the energy source falls below a minimum voltage threshold, the battery management system determines if a minimum temperature threshold is reached based on measurement of a temperature of the energy source, and wherein the battery management system is configured to provide instructions to activate the plurality of resistive heating elements if the temperature of the energy source is less than or equal to the minimum temperature threshold.

18. The system of claim 17 further comprising:
a truck control system in communication with the battery management system.

19. The system of claim 17, wherein the charger wirelessly communicated with the battery management system.

20. A method of charging an energy source comprising:
providing a battery including a counterweight case and an energy source, wherein the energy source is a lithium ion battery;
providing at least one heating element positioned to heat at least one of the counterweight case and the energy source;
coupling the energy source to a battery management system;
coupling an automatic charger with the battery management system; and
providing instructions to the battery management system that include:
monitoring a voltage of the energy source to determine whether the voltage falls below a minimum voltage threshold;
determining if the temperature is less than or equal to a minimum temperature threshold when the voltage falls below the minimum voltage threshold;
upon determining that the temperature is less than or equal to the minimum temperature threshold, providing a voltage to the at least one heating element when a battery temperature falls below a minimum temperature threshold; and
providing an AC voltage to the energy source when the battery temperature falls below the minimum temperature threshold.

21. The method of claim 20 further comprising:
providing instructions to send battery information between the battery management system and the charger.

22. The method of claim 20 further comprising:
providing instructions to send battery information between the battery management system and a truck control system.

23. The method of claim 20, wherein the minimum temperature threshold is below 0 degrees Celsius.

* * * * *

UNITED STATES PATENT AND TRADEMARK OFFICE
CERTIFICATE OF CORRECTION

| | | |
|---|---|---|
| PATENT NO. | : 10,923,775 B2 | Page 1 of 1 |
| APPLICATION NO. | : 15/678365 | |
| DATED | : February 16, 2021 | |
| INVENTOR(S) | : John Bryant Kirk et al. | |

It is certified that error appears in the above-identified patent and that said Letters Patent is hereby corrected as shown below:

In the Specification

Column 8, Line 2, "$I_{bat\_charge_{cc}}$" should be -- $I_{bat\_charge\_cc}$ --.

Signed and Sealed this
Tenth Day of May, 2022

Katherine Kelly Vidal
*Director of the United States Patent and Trademark Office*